United States Patent [19]

Silberberg et al.

[11] 4,251,436

[45] Feb. 17, 1981

[54] INORGANIC FILLER MATERIAL AND POLYMER COMPOSITION CONTAINING THE SAME

[75] Inventors: Joseph Silberberg, Brooklyn; Edward D. Weil, Hastings-on-Hudson, both of N.Y.

[73] Assignee: Stauffer Chemical Company, Westport, Conn.

[21] Appl. No.: 974,282

[22] Filed: Dec. 29, 1978

[51] Int. Cl.$^3$ ................................................ C08K 9/00
[52] U.S. Cl. ............................. 260/42.14; 106/288 B
[58] Field of Search ............ 260/37 N, 42.14, 45.7 P; 428/403; 106/288 B, 308 B

[56] References Cited

U.S. PATENT DOCUMENTS

| 3,050,487 | 8/1962 | Solomon | 260/30.6 |
| 3,227,564 | 1/1966 | Stenden | 260/DIG. 40 |
| 3,344,107 | 9/1967 | Miller | 260/37 N |
| 3,647,745 | 3/1972 | Jennings | 260/42.14 |
| 4,029,513 | 6/1977 | Vessey et al. | 428/403 X |
| 4,174,340 | 11/1979 | Lüders et al. | 260/42.14 |
| 4,183,843 | 1/1980 | Koenig et al. | 260/40 R |

FOREIGN PATENT DOCUMENTS

| 49-46101 | 12/1974 | Japan | 428/403 |
| 2315489 | 3/1976 | France | 428/403 |

OTHER PUBLICATIONS

Chemical Abstracts; vol. 87; No. 152951v; 1977.

Primary Examiner—Lewis T. Jacobs
Attorney, Agent, or Firm—Richard P. Fennelly

[57] ABSTRACT

An inorganic filler material which has improved compatibility characteristics with certain polymeric substrates is disclosed. This filler material is one which is treated with an effective amount, for such improved compatibility of a composition containing a saturated hydrocarbyl acid phosphate and/or pyrophosphate compound, or an alkali metal or alkaline earth salt thereof.

15 Claims, No Drawings

INORGANIC FILLER MATERIAL AND POLYMER COMPOSITION CONTAINING THE SAME

BACKGROUND OF THE INVENTION

1. Field of the Invention

The present invention relates to a treated inorganic filler material having improved compatibility characteristics when added to certain polymeric substrates and to the filled polymer compositions improved by the presence of the treated filler material.

2. Description of the Prior Art

Inorganic fillers have been used in certain polymers, for example, thermoplastic polymers, to impart dimensional rigidity and lower costs to the resulting blend of filler and polymer. When the filler is added to such polymers at even low loadings, however, certain of the physical properties of such polymers (e.g., impact strength) begin to become adversely affected. Also, a large amount of extra energy is needed to uniformly disperse the inorganic filler in the polymer. In order to overcome these shortcomings, it has been proposed that either: (1) a polar copolymer be added during the polymerization of the polymeric material; (2) coupling agents or other additives be added to either the filler, polymer, or filled polymer composition; or (3) the filled formulation be crosslinked (See Handbook of Fillers and Reinforcements of Plastics, edited by H. S. Katz et al., pp. 112-115, 1978).

The prior art has taught the addition of various types of coupling agents or other additives to the filler material, polymer, or the composite to improve the compatibility of the filler and polymer for one another. For example, U.S. Pat. No. 3,926,873 to I. Aishima et al. advocates the use of aliphatic or aromatic carboxylic acids having from 3 to 11 carbon atoms, one or two ethylenic unsaturations, and one or two carboxyl groups as such a class of additive. A family of titanates, available from Kenrich Petrochemicals, Inc., have also been proposed for use as additives to improve the compatibility of polymer and filler (Handbook of Fillers and Reinforcements for Plastics, supra.; Modern Plastics, December 1974, p. 68; Modern Plastics Encyclopedia, Vol. 53, No. 10A, October 1976, pp. 161 and 166; and U.S. Pat. Nos. 4,094,853 and 4,098,758).

Although the prior art contains a teaching that certain phosphorus-containing compounds can function as coupling agents or adhesion promoters in adhesive systems (see P. E. Cassidy et al., J. Macromol. Sci., Revs. Polymer Technol. D1 (1) pp. 2 and 22-23, 1971), it has not been appreciated that compositions containing hydrocarbyl phosphate and/or pyrophosphate compounds and/or their alkali metal or alkaline earth salts can be used to improve the compatibility of an inorganic filler and polymeric substrate. For example, U.S. Pat. No. 3,404,023 to M. E. Schrader et al. teaches the use of diethyl phosphite (rather than a phosphate or pyrophosphate) to improve the compatibility of glass fibers with a resin substrate. Also, U.S. Pat. No. 3,344,107 to R. E. Miller teaches the use of various phosphorus-containing compounds containing reactive alkenyl, acrylic or methacrylic groups (rather than non-reactive saturated hydrocarbyl groups) as coupling agents between a polymer substrate and a mineral reinforcing agent.

SUMMARY OF THE PRESENT INVENTION

It has been unexpectedly found that compositions containing a titanium-free, saturated hydrocarbyl acid phosphate and/or pyrophosphate compound, and/or an alkali metal and/or alkaline earth salt thereof, can be applied to an inorganic filler, a polymeric substrate, or the composite to improve the compatibility of the filler and polymeric substrate. The improved compatibility of filler and polymeric substrate is demonstrated by such physical effects as: a greater ease of dispersion of the filler material into the polymeric substrate; and certain improved physical properties for the filled polymer composite (e.g., better impact resistance, lower melt viscosity, etc.).

DESCRIPTION OF PREFERRED EMBODIMENTS OF THE PRESENT INVENTION

The type of inorganic filler material which can be treated in accordance with the present invention is known to persons of ordinary skill in the art. It is a finely divided material having an average particle size of from about 0.01 micron to about 100 microns, preferably from about 0.03 micron to about 25 microns, so as to be suitable as a filler material for polymeric substrates. The type of inorganic filler which may be used in the practice of the present invention includes such fillers as the metal silicates and carbonates. Representative examples of two silicate materials are milled glass fiber and mica. One preferred metal carbonate is calcium carbonate.

The present invention, as described above, involves treating the inorganic filler material either before, during, or after admixture to the polymer with an effective amount of a composition containing a saturated hydrocarbyl acid phosphate, pyrophosphate and/or alkali metal or alkaline earth metal salt thereof. The composition can contain the phosphate, pyrophosphate or salt in either substantially pure form or as a compatible mixture of any of said phosphates, pyrophosphates, or salts, optionally in an appropriate solvent, for example, an organic solvent, such as one of the chlorinated hydrocarbon solvents, or water. The amount of said phosphate, pyrophosphate and/or salt which is added to the filler material will generally range from about 0.05% to about 5%, by weight of the filler material, preferably from about 0.1% to about 3%, by weight. Representative saturated hydrocarbyl acid phosphate and pyrophosphate compounds which can be present in the aforementioned compositions and which can be treated with the alkali metal or alkaline earth salt, if desired, in accordance with the present invention include compounds of the formulae:

where n is either 1 or 2 and R is a saturated hydrocarbyl group which is formed by the removal of a hydrogen atom from a saturated alkyl, aryl, alkaryl, or aryl alkyl group; when n=2 each R can be different;

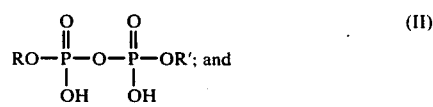

-continued

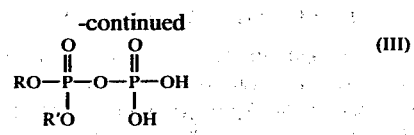
(III)

where R and R' are the same or different and either has the same meaning given above for R is formula I. Mixtures of any of the foregoing are included within the scope of the present invention. The saturated hydrocarbyl groups include the $C_4$–$C_{40}$ alkyl groups, preferably the $C_4$–$C_{20}$ alkyl groups, the phenyl group, the alkyl phenyl, and the phenylalkyl groups. The term "alkyl" as used herein is intended to cover alicyclic alkyl groups, alicyclic alkyl groups substituted with non-interfering radicals (e.g., halogen, alkoxy and acyloxy), which do not impart hydrophilic properties to the compound and do not react with any acid phosphate moiety which is present, and cycloalkyl groups. The term "phenyl" is intended to cover the unsubstituted phenyl group as well as the phenyl group substituted with the aforementioned non-interfering substituents.

These compounds are formed by reaction of alcohols of the formula ROH with a phosphorylating agent such as phosphoric acid, polyphosphoric acid, or phosphoric anhydride. The alkali metal or alkaline earth metal salts of these compositions (which are also intended to be encompassed by the present invention) are formed by reacting the compositions with a suitable alkali metal or alkaline earth metal base, such as an alkali metal or alkaline earth metal hydroxide, carbonate, or bicarbonate.

The treated inorganic filler material can be incorporated in the desired amount e.g., from about 5% to about 85%, by weight of the final filler/polymeric substrate combination, to give filled polymeric materials having utility as window frames, structural automobile parts, cabinet components, and the like. Representative thermoplastic polymers that can be utilized include the polyolefinic polymers (e.g., polyethylene and polypropylene), vinyl polymers (either in rigid, non-plasticized form, in plasticized form, or in plastisol form), and the polyamides (e.g., nylon 11). In utilizing the current invention, it has been found desirable to exercise some degree of care in selecting a given filler, given polymer, and given phosphate, pyrophosphate, and/or salt so that the results of the invention are obtained. In general, the use of an acid phosphate and/or pyrophosphate will be most applicable with polar polymers (e.g., polyamide polymers) containing either acidic (e.g., mica) or neutral (e.g., glass) fillers or with non-polar polymers (e.g., polyolefinic polymers) containing basic fillers (e.g., metal carbonate fillers). The use of the neutralized alkali metal or alkaline earth salts of the acid phosphate and/or pyrophosphate compounds will be most applicable with either non-polar (e.g., polyolefinic) or slightly polar (e.g., vinyl chloride) polymers when combined with basic fillers (e.g., metal carbonate fillers).

The present invention is further illustrated by the following Examples:

EXAMPLES 1–10

These Examples set forth selected physical properties for untreated (control) calcium carbonate/polypropylene blends (Example Nos. 1 and 2), a blend of commercially available fatty acid-treated calcium carbonate and polypropylene (Example No. 3), and a series of blends made in accordance with the present invention (Example Nos. 4–10).

The blends of the present invention were made by mixing 60 parts by weight of polypropylene homopolymer and 40 parts by weight of the selected calcium carbonate sample (3 to 5 micron ground limestone) at a temperature of about 400° to 425° C. at 50 rpm. in a single screw extruder (20:1 L L/D; 2 stage; 2:1 compression ratio; 3.81 cm. diameter). Table 2, which is given below, lists the processing, mechanical, toughness, and heat deflection temperature (DTL) characteristics for blends made from the various calcium carbonate fillers that were tested. The test specimens were injection molded at about 370° to 400° C., except for those specimens for dart drop impact and color testing which were compression molded at about 400° C. In those cases where the calcium carbonate is treated, the agent was applied in a twin shell mixer equipped with a high speed intensifier bar from a 20 wt. % solution in methylene chloride, unless otherwise indicated. The Example numbers given below in Table 1 list the respective treatment additives for the calcium carbonate. The acid phsophates and pyrophosphates listed in Table 1 are reaction mixtures of mono- and di- products:

TABLE 1

| Example No. | CaCO$_3$ Treatment |
|---|---|
| 1 | None (Control) |
| 2 | None (Control) |
| 3 | stearate (1%) (Commercial) |
| 4 | 2-Ethylhexyl acid pyrophosphate (1%) |
| 5 | 2-Ethylhexyl acid pyrophosphate (2%) |
| 6 | Butyl acid phosphate (1%) |
| 7 | Octyl acid phosphate (1%) |
| 8 | Octyl acid phosphate (1%)* |
| 9 | Tridecyl acid phosphate (1%) |
| 10 | 2-Ethylhexyl acid pyrophosphate sodium salt (1%)** |

*applied neat and not from solution
**applied from an aqueous solution. The composition which was applied is available commercially as VICTAWET 35B from Stauffer Chemical Company. Specialty Chemical Division. It is formed by reacting 2 moles of 2-ethylhexyl alcohol and 1 mole of phosphorus pentoxide and then treating the resulting reaction mixture with sodium hydroxide.

TABLE 2

| Example No. | PROCESSING | | MECHANICALS | | | | | Reversed | Falling |
|---|---|---|---|---|---|---|---|---|---|
| | Melt Visc.[1] (poise at $10^3$ sec.$^{-1}$) | Energy[2] (meter gm · min × $10^{-3}$) | Flex. Str.[3] (MPa) | Flex. Mod.[3] (GPa) | Tensile Str.[4] (MPa) | Ultimate Elongation[4] % | Izod Impact[5] (J/m) | Notch Impact[6] (J/m) | Dart Impact[7] (J) |
| 1 (Control) | 2100 | 4.80 | 51.2 | 2.97 | 25.2 | 70 | 21 | 171 | 1.6 |
| 2 (Control) | 2200 | 4.34 | 49.7 | 2.83 | 24.5 | 102 | 21 | 235 | 1.6 |
| 3 (Commercial) | 1900 | 3.69 | 49.1 | 2.92 | 24.3 | 194 | 27 | 363 | 3.2 |
| 4 | 1900 | 3.70 | 47.2 | 2.70 | 24.1 | 111 | 21 | 203 | 2.0 |
| 5 | 1800 | 3.21 | 47.0 | 2.56 | 23.2 | 118 | 21 | 235 | 2.3 |
| 6 | 1900 | 3.46 | 51.0 | 2.98 | 25.1 | 82 | 21 | 246 | 1.6 |
| 7 | 1700 | 3.15 | 48.0 | 2.68 | 24.1 | 132 | 21 | 326 | 2.5 |
| 8 | 1700 | 3.78 | 47.5 | 2.61 | 23.8 | 113 | 21 | 208 | 2.0 |
| 9 | 1600 | 2.29 | 47.6 | 2.60 | 24.1 | 122 | 21 | 267 | 2.7 |

TABLE 2-continued

| | PROCESSING | | MECHANICALS | | | | | Reversed | Falling |
| --- | --- | --- | --- | --- | --- | --- | --- | --- | --- |
| Example No. | Melt Visc.(1) (poise at $10^3$ sec.$^{-1}$) | Energy(2) (meter gm · min $\times 10^{-3}$) | Flex. Str.(3) (MPa) | Flex. Mod.(3) (GPa) | Tensile Str.(4) (MPa) | Ultimate Elongation(4) % | Izod Impact(5) (J/m) | Notch Impact(6) (J/m) | Dart Impact(7) (J) |
| 10 | 1900 | 2.95 | 46.1 | 2.50 | 23.6 | 182 | 32 | 326 | 3.2 |

(1)This test was performed at 200° C. on a constant rate extrusion plastometer with a load measuring system.
(2)The energy required to mix the polypropylene/calcium carbonate samples was determined by graphing the torque values generated by the action of a mixer measuring head (50 rpm at 205° C.) versus time for zero to eight minutes on a Plastograph unit for 30 gm. of fluxed polypropylene upon addition of 30 gm. of the selected calcium carbonate. A similar curve was generated for the equivalent volume (37 gm.) of unfilled polypropylene. The area under the second curve was then subtracted from the area under the first curve to give the viscosity values per unit time in units of meter-gm-min. Lower numbers indicate a more easily processable mixture and are desired.
(3)tested in accordance with ASTM D-790, Method I, Procedure B.
(4)tested in general accordance with ASTM D-638 except that the specimens were 1.27 cm. wide and 0.30 cm. thick. The gage length was 7.0 cm. and the crosshead speed was 5.08 cm./min.
(5)tested in accordance with ASTM D-256, Method A, 0.3175 cm. thick specimens.
(6)tested in accordance with ASTM D-256, Method E, 0.3175 cm. thick specimens.
(7)test performed on 0.135 cm. thick sheets on a 2.2 cm. inner diameter support ring using a 1.8 kg. dart having a tip of 0.75 cm. radius by varying the height from which the dart falls. The listed value is the energy at which 50% of the dart drops result in fracture.

The significance of the test data described in Table 2 may be summarized as follows:

1. The processing data illustrate that acid alkyl phohphate and pyrophosphate treatments of Example Nos. 4–10 result in a generally equal or better melt viscosity and ease of blending than either the untreated or commercially stearate treated material (Example Nos. 1–3). Generally, a longer alkyl chain length in the acid alkyl phosphate or pyrophosphate yields better processing properties.

2. The data relating to mechanical properties illustrate that as one increases the alkyl chain length in the alkyl acid phosphate or pyrophosphate, a slight, but not serious, decrease in the strength of the material is noted. Treatment with butyl acid phosphate gives a product having physical properties that closely correspond to those produced by the specimens containing the untreated calcium carbonate filler.

3. The impact strength of the specimens are generally improved by treatment with the acid alkyl phosphates and pyrophosphates.

EXAMPLES 11–16

These Examples illustrate the preparation of composites of nylon 11 with a variety of fillers (at the 25%, by weight level) both with and without a small amount of didecyl acid phosphate.

Examples 11 and 12 show nylon 11/mica (375 mesh muscovite) composites, with Example 11 being a control run, and Example 12 showing the present invention with use of a didecyl acid phosphate additive.

Examples 13 and 14 show use of nylon 11/milled glass fiber composites, with Example 13 being a control run, and Example 14 showing the present invention with use of a didecyl acid phosphate additive.

Examples 15 and 16 are presented for comparison purposes and show nylon 11/calcium carbonate composites. The presence of didecyl acid phosphate in Example 16 does not result in improved compatibility for the blend as compared to Control Example 15.

The various composites of nylon 11/filler (either mica, milled glass fiber, or calcium carbonate) were prepared in accordance with the general process shown in Examples 1–10 with the didecyl acid phosphate being present in Example Nos. 12, 14 and 16 at 2%, by weight of the filler. The physical property data for these composites is as follows. Those runs which carry the asterisk are in accordance with the present invention.

| Example No. | DTL °C. | PROCESSING PROPERTIES | | MECHANICAL PROPERTIES - WET | | MECHANICAL PROPERTIES - DRY | |
| --- | --- | --- | --- | --- | --- | --- | --- |
| | | Extrusion Compounding Torque(1) (meter-grams) | Melt Viscosity(2) (poise at $10^3$sec) | Tensile Str.(3) (MPa) | Flexural Mod. (GPa) | Tensile Str.(3) (MPa) | Flexural Mod. (GPa) |
| 11 | 97 | 5900 | 4000 | 495 | 3.13 | 537 | 3.29 |
| 12* | 131 | 4700 | 4130 | 507 | 3.43 | 557 | 3.60 |
| 13 | 44 | 4200 | 2510 | 303 | 1.28 | 371 | 1.50 |
| 14* | 48 | 3000 | 2820 | 301 | 1.30 | 352 | 1.46 |
| 15 | 44 | 5100 | 7170 | 353 | 1.25 | 397 | 1.54 |
| 16 | 45 | 5250 | 7650 | 334 | 1.30 | 385 | 1.43 |

(1)these numbers are directly related to the particular extrusion conditions that were utilized and, therefore, have significance on a relative basis only.
(2)this test was performed at 215° C. on a constant rate extrusion plastometer with a load measuring system.
(3)24 hour soak in distilled water at 50° C., followed by equilibration at 24° C. and 50% relative humidity.
(4)tested in general accordance with ASTM D-638, except that the specimens were 0.32 cm. wide and thick. The gage length was 1.42 cm. and the crosshead speed was 1.27 cm./min.

EXAMPLES 17–18

This Example illustrates the lowered processing force (equilibrium torque) required to form a composite of low density polyethylene and calcium carbonate containing 1%, by weight of the calcium carbonate, of tridecyl acid phosphate (Example 18) as compared to a control composite of low density polyethylene and calcium carbonate (Example 17).

The equilibrium torque for these composites was determined by graphing the torque values generated by the action of a mixer measuring head (50 rpm at 205° C.) on a Plastograph unit for 30 gm. of fluxed, low density polyethylene upon addition of 30 gm of the selected calcium carbonate (either alone or in combination with the 1% of tridecyl acid phosphate). The torque value after equilibrium is attained in the system is the "equilibrium torque".

The results are as follows:

| Example No. | Equilibrium Torque (meter-grams) |
|---|---|
| 17 (control) | 1360 |
| 18 | 1280 |

EXAMPLES 19-21

These Examples illustrate the use of the present invention to reduce the viscosity of vinyl chloride plastisol/calcium carbonate mixtures (Examples 20 and 21) as compared to a control mixture (Example 19). A plastisol formulation was formed by mixing in a planetary mixer 100 parts by weight of emulsion grade polyvinyl chloride (SCC-20 from Stauffer Chemical Company), 60 parts by weight of dioctyl phthalate, 5.0 parts by weight of epoxidized octyl phthalate (Drapex 4.4 from Argus Chemical) and 2 parts by weight of barium-cadmium stabilizer (Argus 565A, from Argus Chemical). In Examples 20 and 21 were added 50 parts by weight of calcium carbonate filler which had been treated with 1%, by weight of the filler, of tridecyl acid phosphate, and the 2-ethylhexyl acid phosphate sodium salt used in Example 10, respectively. Untreated calcium carbonate filler was used in Example 19. The Brookfield viscosities (No. 6 spindle) at 2 rpm/20 rpm were as follows after 1 and 7 days. The values are in poise with lower values indicating a more desired, less viscous mixture:

| Example No. | BROOKFIELD VISCOSITY (2rpm/20rpm) (In poise) | |
|---|---|---|
| | 1 day | 7 days |
| 19 (control) | 705/325 | 700/340 |
| 20 | 235/138 | 270/166 |
| 21 | 170/114 | 200/137 |

EXAMPLES 22-24

This Example illustrates the use of a neutralized alkyl acid phosphate coupling agent in rigid vinyl/calcium carbonate composites (Example 23), the comparative use of an alkyl acid phosphate in a similar composite (Example 24), and a control rigid vinyl/calcium carbonate composite without any phosphate additive (Example 22).

The rigid vinyl composition comprised 100 parts by weight of suspension grade polyvinyl chloride resin (SCC-676 from Stauffer Chemical Company), 3 parts by weight of acrylic process aid (K-120N from Rohm and Haas), 3 parts by weight of tin stabilizer (Thermolite 31 from M and T Chemicals), 1 part by weight of calcium stearate lubricant, 0.5 parts by weight of montan wax lubricant (Wax E from American Hoechst), and 0.1 parts by weight of polyethylene lubricant (PE 629A, from Allied Chemical). To each of the formulations was added 50 parts by weight of milled calcium carbonate, with the samples in Examples 23 and 24 also containing 1%, by weight of the filler, of the 2-ethylhexyl acid phosphate sodium salt of Example 10 and tridecyl acid phosphate, respectively.

The equilibrium torque values (79 gm. total, 200° C. 60 rpm, and as defined in Example 18) and dart drop values for the compositions were as follows:

| Example No. | Equilibrium Torque (meter-gram) | Dart drop Impact[1] (J) |
|---|---|---|
| 22 (control) | 3040 | 4.3 |
| 23* | 2840 | 5.6 |
| 24 | 3600 | 2.7 |

*Present invention.
[1] Test performed on 0.159 cm. thick sheets on a 2.2 cm. inner diameter support ring using a 1.8 kg. dart having a tip of 0.75 cm. radius by varying the height from which the dart falls. The listed value is the energy at which 50% of the dart drops result in fracture.

EXAMPLES 25-26

These Examples illustrate the use of an aryl acid phosphate coupling agent to enhance the dispersion of the respective materials used to form a polypropylene/calcium carbonate composite (Example 26) and the comparative use of untreated calcium carbonate and polypropylene to form a composite (Example 25).

Polypropylene homopolymer (30 gm.) was fluxed for 5 minutes in a Brabender Plasticorder apparatus followed by addition of 30 gm. of calcium carbonate (3-5 microns, average particle size) which had either been untreated (Example 25) or which had been treated with 1%, by weight of the calcium carbonate, of octylphenyl acid phosphate. The fluxing conditions inside the apparatus were 200° C. and 60 rpm. The Table given below lists the turque (in meter-grams) at successive intervals during the fluxing process with the time intervals being measured from the addition of the filler. Lower numbers are desired as indicative of a more easily processable mixture:

| Example No. | TORQUE (meter-grams) after | | | |
|---|---|---|---|---|
| | 0 min. | 5 min. | 10 min. | 15 min. |
| 25 | 2000 | 1150 | 950 | 600 |
| 26 | 1500 | 900 | 600 | 500 |

The foregoing Examples illustrate certain preferred embodiments of the present invention and should therefore not be construed in a limiting sense. The scope of protection which is sought is set forth in the claims which follow.

We claim:

1. An inorganic filler material for polymeric substrates, said filler containing an effective amount for improved compatibility with the polymeric substrate of a composition containing a compound selected from the group consisting of the saturated hydrocarbyl acid phosphates, the saturated hydrocarbyl acid pyrophosphates, the alkali metal and alkaline earth metal salts thereof, and mixtures thereof.

2. A filler material as claimed in claim 1 wherein the saturated hydrocarbyl acid phosphate compound has the formula

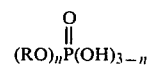

where R is independently a $C_4$–$C_{40}$ alkyl group, a phenyl group, a $C_4$–$C_{40}$ alkyl phenyl group, or a phenyl $C_4$–$C_{40}$ alkyl group, and n is either 1 or 2.

3. A filler material as claimed in claim 1 wherein the saturated hydrocarbyl acid pyrophosphate compound as a formula selected from the group consisting of:

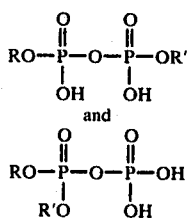
and where R and R' are independently a $C_4$–$C_{40}$ alkyl group, a phenyl group, a $C_4$–$C_{40}$ alkyl phenyl group, or a phenyl $C_4$–$C_{40}$ alkyl group.

4. A filler material as claimed in either claim 2 or 3 wherein R is independently a $C_4$–$C_{20}$ alkyl group or a phenyl group.

5. A filler material as claimed in claim 1 wherein said material contains from about 0.05% to about 5%, by weight of the compound.

6. A filler material as claimed in claim 5 wherein the amount of said compound is from about 0.1% to about 3%, by weight of said filler material.

7. A filler material as claimed in either claim 5 or 6 having an average particle size range of from about 0.01 to about 100 microns.

8. A filler material as claimed in claim 2 wherein the saturated hydrocarbyl acid phosphate is selected from the group consisting of butyl acid phosphate, tridecyl acid phosphate, the sodium salt of (2-ethylhexyl) acid pyrophosphate, octyl acid phosphate, and octylphenyl acid phosphate.

9. A filler material as claimed in claim 3 wherein the saturated hydrocarbyl acid pyrophosphate is 2-ethylhexyl acid pyrophosphate.

10. A filler material as claimed in either claim 1 or 2 or 3 or 5 or 6 or 8 or 9 which is selected from the group consisting of the metal silicates and carbonates.

11. A filler material as claimed in either claim 1 or 2 or 3 or 5 or 6 or 8 or 9 which is selected from the group consisting of glass, calcium carbonate, and mica.

12. A thermoplastic polymeric substrate which contains from about 5% to about 85%, by weight, of the filler material and the compound of either claim 1 or 2 or 3 or 5 or 6 or 8 or 9.

13. A polyolefin substrate which contains from about 5% to about 85%, by weight, of the filler material and compound of either claim 1 or 2 or 3 or 5 or 6 or 8 or 9.

14. A polyamide substrate which contains from about 5% to about 85%, by weight, of the filler material and compound of either claim 1 or 2 or 3 or 5 or 6 or 8 or 9.

15. A vinyl chloride polymer substrate which contains from about 5% to about 85%, by weight, of the filler material and compound of either claim 1 or 2 or 3 or 5 or 6 or 8 or 9.

* * * * *

UNITED STATES PATENT AND TRADEMARK OFFICE
CERTIFICATE OF CORRECTION

PATENT NO. : 4,251,436
DATED : February 17, 1981
INVENTOR(S) : Joseph Silberberg et al.

It is certified that error appears in the above-identified patent and that said Letters Patent are hereby corrected as shown below:

Col. 3, line 8, "is" should be -- in --;

Col. 4, line 35, "phsophates" should be -- phosphates --;

Col. 8, Claim 3, line 3, "as a" should be -- has a --.

Signed and Sealed this

First Day of September 1981

[SEAL]

Attest:

GERALD J. MOSSINGHOFF

Attesting Officer

Commissioner of Patents and Trademarks